(12) United States Patent
Xiao et al.

(10) Patent No.: US 12,100,944 B2
(45) Date of Patent: Sep. 24, 2024

(54) CONTROLLING DEVICE AND ELECTRONIC ATOMIZATION DEVICE

(71) Applicant: Shenzhen Smoore Technology Limited, Shenzhen (CN)

(72) Inventors: Feng Xiao, Shenzhen (CN); Huakai Yuan, Shenzhen (CN)

(73) Assignee: SHENZHEN SMOORE TECHNOLOGY LIMITED, Shenzhen (CN)

(*) Notice: Subject to any disclaimer, the term of this patent is extended or adjusted under 35 U.S.C. 154(b) by 375 days.

(21) Appl. No.: 17/530,468

(22) Filed: Nov. 19, 2021

(65) Prior Publication Data

US 2022/0166208 A1   May 26, 2022

(30) Foreign Application Priority Data

Nov. 23, 2020  (CN) .......................... 202022737966.7

(51) Int. Cl.
*H02H 5/04* (2006.01)
*B05B 15/14* (2018.01)
*A24F 40/50* (2020.01)
*A24F 40/57* (2020.01)

(52) U.S. Cl.
CPC ............ *H02H 5/047* (2013.01); *B05B 15/14* (2018.02); *A24F 40/50* (2020.01); *A24F 40/57* (2020.01)

(58) Field of Classification Search
CPC ........ A24F 40/00–95; H02H 5/04–048; B05B 15/00; B05B 15/14
See application file for complete search history.

(56) References Cited

U.S. PATENT DOCUMENTS

2015/0189916 A1* 7/2015 Wu .................. H02J 7/00712
                                                            392/386
2021/0401061 A1* 12/2021 Davis .................. A24F 40/57

FOREIGN PATENT DOCUMENTS

EP          2085997 A2 *  8/2009   ........... H01H 37/002

OTHER PUBLICATIONS

Canadian office action, Canadian Application No. 3, 139,394, mailed Dec. 5, 2022 (3 pages).

* cited by examiner

*Primary Examiner* — Jared Fureman
*Assistant Examiner* — Christopher J Clark (57) ABSTRACT

The present disclosure discloses a controlling device and an electronic atomization device, the controlling device includes an atomizing output circuit, a protecting circuit and a controller. The atomizing output circuit is configured to be electrically connected with the atomizer and apply a voltage to the atomizer. The protecting circuit includes a temperature sensitive unit, and the temperature sensitive unit is configured to sense a temperature of the atomizer. The controller is electrically connected with the atomizing output circuit, and configured to control the atomizing output circuit. The protecting circuit is configured to control the atomizing output circuit according to the temperature of the atomizer sensed by the temperature sensitive unit. In response to the temperature of the atomizer is higher than a predetermined value, the protecting circuit makes the electrical connection between the atomizing output circuit and the atomizer being disconnected.

18 Claims, 5 Drawing Sheets

CONTROLLING DEVICE AND ELECTRONIC ATOMIZATION DEVICE

CROSS REFERENCE TO RELATED DISCLOSURES

The present disclosure claims the foreign priority of the Chinese patent disclosure No. 202022737966.7, entitled "CONTROLLING DEVICE AND ELECTRONIC ATOMIZATION DEVICE" and filed on Nov. 23, 2020 in the China National Intellectual Property Administration, the entire contents of which are hereby incorporated by reference in their entireties.

TECHNICAL FIELD

The present disclosure relates to the field of atomization technology, and in particular, to a controlling device and an electronic atomization device.

BACKGROUND

An atomizer is detachably arranged on a controlling device of an electronic atomization device, and the atomizer is replaceable. The atomizer may be replaced when an aerosol-generating material in the atomizer has run out or the atomizer is damaged. In the electronic atomization device of which the atomizer is replaceable, a malfunction of the controlling device of the electronic atomization device is caused by some reason, for example, the controlling device continuously and automatically applies the voltage to the atomizer, so that the atomizer has melted or deformed due to continuous heating. Thus, a safety risk may be taken to a user of the electronic atomization device. Currently, the structure of electronic atomization device is simple and inexpensive, it is difficult to add too many redundant designs on hardware and software to effectively protect the atomizer from overheating or deforming.

SUMMARY

Therefore, the present disclosure provides a controlling device and an electronic atomization device, to overcome the technical problem of how to protect the atomizer from thermal melting or deforming in the prior art.

In order to overcome the aforementioned technical problem, a first aspect is provided by the present invention is a controlling device, configured to be cooperatively utilized with an atomizer to atomize an aerosol-generating material, includes an atomizing output circuit, configured to be electrically connected with the atomizer and apply a voltage to the atomizer; a controller, electrically connected with the atomizing output circuit, and configured to control the atomizing output circuit; a protecting circuit, including a temperature sensitive unit, wherein the temperature sensitive unit is configured to sense a temperature of the atomizer; wherein, the protecting circuit is configured to control the atomizing output circuit according to the temperature of the atomizer sensed by the temperature sensitive unit; in response to the temperature of the atomizer is higher than a predetermined value, the protecting circuit makes the electrical connection between the atomizing output circuit and the atomizer being disconnected.

Furthermore, the controller is electrically connected with the temperature sensitive unit; the temperature sensitive unit transmits the temperature of the atomizer to the controller, and the controller compares the temperature of the atomizer to the predetermined value, and in response to the temperature of the atomizer is higher than the predetermined value, the controller controls the electrical connection between the atomizing output circuit and the atomizer being disconnected.

Furthermore, the temperature sensitive unit includes a temperature sensor, the temperature sensor is selected from the group consisting of a thermocouple, a platinum resistance, a positive temperature coefficient (PTC) thermistor, and a negative temperature coefficient (NTC) thermistor.

Furthermore, the atomizing output circuit is connected with the protecting circuit; the temperature sensitive unit is configured to control the connection or disconnection of the protecting circuit according to the temperature of the atomizer sensed by the temperature sensitive unit, so that the atomizing output circuit is disconnected according to the connection or disconnection of the protecting circuit.

Furthermore, the temperature sensitive unit includes a temperature sensitive switch, and the temperature sensitive switch is configured to sense the temperature of the atomizer and determine whether or not the temperature of the atomizer is higher than the predetermined value; and in response to the temperature of the atomizer is higher than the predetermined value, the connection or disconnection of the protecting circuit is controlled by the temperature sensitive switch being turn on or turn off.

Furthermore, the atomizing output circuit includes a cut-off device, the cut-off device is connected with the protecting circuit, and the atomizing output circuit is controlled to be disconnected in response to the connection or disconnection of the protecting circuit; the cut-off device is one of a relay and a metal oxide semiconductor (MOS) field-effect transistor.

Furthermore, the controlling device further includes a connection seat, and the connection seat is disposed at an end of the controlling device near the atomizer; the connection seat is provided with a heat conducting element, and the heat conducting element is configured to conduct heat from the atomizer to the temperature sensitive unit.

Furthermore, a connector is disposed on the connection seat, the connector is configured to fix the controlling device and the atomizer, and the connector is used as the heat conducting element.

Furthermore, the heat conducting element is a metal thimble.

Furthermore, the predetermined value is 50-80° C.

Furthermore, the controlling device further includes a memory, and the predetermined value is stored in the memory.

Furthermore, the controlling device further includes a reminder; in response to the atomizing output circuit and the atomizer are disconnected, the controller controls the reminder to alert a user.

According to a second aspect, an electronic atomization device is provided and includes an atomizer and a controlling device, the controlling device is the controlling device according to any one of above mentioned.

BRIEF DESCRIPTION OF THE DRAWINGS

In order to more clearly illustrate the technical solutions of the embodiments of the present disclosure, the drawings for the description of the embodiment will be described in brief. Obviously, the drawings in the following description are only some of the embodiments of the present disclosure.

For a person of ordinary skill in the art, other drawings may be obtained based on the following drawings without any creative work.

DETAILED DESCRIPTION

Technical solutions of the embodiments of the present disclosure will be clearly and comprehensively described by referring to the accompanying drawings. Obviously, the embodiments described herein are only a part of, but not all of, the embodiments of the present disclosure. Based on the embodiments in the present disclosure, all other embodiments obtained by a person of ordinary skill in the art without any creative work shall fall within the scope of the present disclosure.

It should be noted that directional indications if present (such as up, down, left, right, front, back, . . . ) in the embodiments of the present disclosure are only expressed to explain relative positional relationships and movement between components in a particular attitude (as shown in the drawings). When the particular attitude is changed, the directional indications shall also be changed accordingly.

In addition, when using expressions "first", "second", and the like in the embodiment of the present disclosure, the expressions "first", "second", and the like are utilized for descriptive purposes only, and shall not be interpreted as indicating or implying relative importance or implicitly specifying the number of an indicated technical feature. Therefore, features defined by "first" and "second" may explicitly or implicitly include at least one of such feature. In addition, technical solutions of various embodiments may be combined with each other, but only on the basis that the technical solutions may be achieved by a person of ordinary skill in the art. When combination of technical solutions appears to be contradictory or unachievable, such combination of technical solutions shall be interpreted as inexistence and excluded from the scope of the present disclosure.

The term "comprising" means "including, but not necessarily limited to"; it specifically indicates open-ended inclusion or membership in a so-described combination, group, series and the like. It should be noted that references to "an" or "one" embodiment in this disclosure are not necessarily to the same embodiment, and such references mean at least one. Unless otherwise defined, all technical and scientific terms used herein have the same meaning as a skilled person in the art would understand. The terminology used in the description of the present disclosure is for the purpose of describing particular embodiments and is not intended to limit the disclosure.

Figure 1:
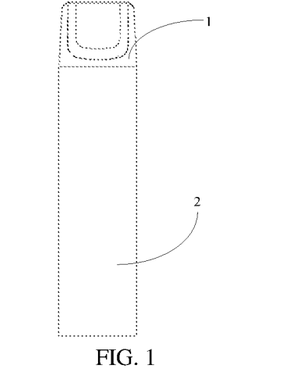
FIG. 1 is a structural schematic view of an electronic atomization device according to the present disclosure.

FIG. 1 is a structural schematic view of an electronic atomization device according to the present disclosure.

The electronic atomization device may be configured to atomize an aerosol-generating material, such as oil, medicine liquid or the like. The electronic atomization device includes an atomizer 1 and a controlling device 2 connected with each other. The atomizer 1 is configured to store the aerosol-generating material and generate an aerosol by atomizing the aerosol-generating material, and can be utilized in different fields, such as medical atomization, electronic cigarette atomization, etc. The controlling device 2 includes a battery and an airflow sensor. The battery is configured to supply power to the atomizer 1, so that the atomizer 1 is capable of atomizing the aerosol-generating material to form the aerosol. The airflow sensor is configured to detect the change of the airflow in the electronic atomization device, so that the electronic atomization device may be started. The controlling device 2 is configured to be cooperatively utilized with the atomizer 1 to atomize the aerosol-generating material. The atomizer 1 and the controlling device 2 may be integrated or may be detachably connected with each other, which may be designed as specific needs. In one embodiment, the atomizer 1 and the controlling device 2 are detachably connected with each other.

Figure 2:
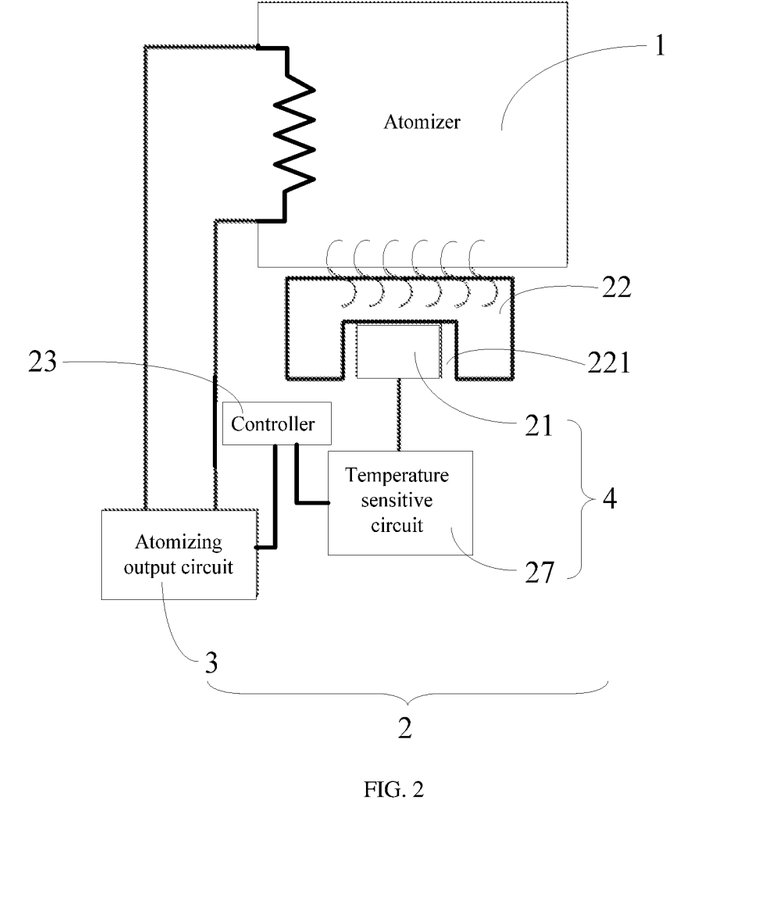
FIG. 2 is a schematic view of an atomizing output circuit and a protecting circuit in an embodiment of the electronic atomization device according to the present disclosure.
Figure 3:
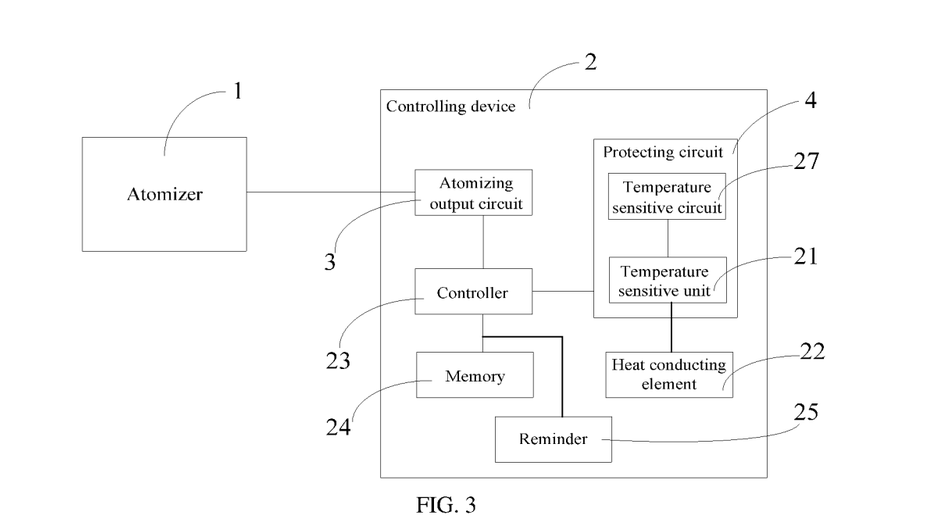
FIG. 3 is a block schematic view of a first embodiment of the electronic atomization device according to the present disclosure.

FIG. 2 is a schematic structural view of an atomizing output circuit and a protecting circuit in an embodiment of the electronic atomization device according to the present disclosure, and FIG. 3 is a block schematic view of a first embodiment of the electronic atomization device according to the present disclosure.

The controlling device 2 includes an atomizing output circuit 3 and a protecting circuit 4. The atomizing output circuit 3 is electrically connected with the atomizer 1 and configured to apply a voltage to the atomizer 1, so that the atomizer 1 can work. The aerosol-generating material may be heated during operation of the atomizer 1, a heat is generated during heating the aerosol-generating material, and the heat generated by continuously heating the aerosol-generating material may be transmitted to a connection between the atomizer 1 and the controlling device 2, and further transmitted to the controlling device 2. The protecting circuit 4 includes a temperature sensitive unit 21 and a temperature sensitive circuit 27, and the temperature sensitive unit 21 is configured to sense a temperature of the atomizer 1. The temperature sensitive circuit 27 is configured to control the atomizing output circuit 3 according to the temperature of the atomizer 1 sensed by the temperature sensitive unit 21. In response to the temperature of the atomizer 1 is higher than a predetermined value, the atomizing output circuit 3 is controlled to be disconnected, namely, the temperature sensitive circuit 27 makes the electrical connection between the atomizing output circuit 3 and the atomizer 1 being disconnected, so that the atomizing output circuit 3 cannot apply any voltage to the atomizer 1. When the heat generated by the atomizer 1 is more than heat normally sucked by user, the redundant heat is conducted to the controlling device 2 and effectively identified by the temperature sensitive unit 21, and the atomizing output circuit 3 is controlled to be disconnected, the purpose of protecting the atomizer 1 is achieved. The predetermined value is 50-80° C. The predetermined value is selected according to the actual heat transmitting and consumption, as long as the predetermined value does not cause the atomizer 1 to be melted or deformed, and does not conflict with the normal work temperature of the atomizer 1. In one embodiment, the predetermined value is preferably 60-70° C.; the work temperature of the atomizer 1 is generally 350° C., when the temperature sensed by the temperature sensitive unit 21 is 60 to 70° C., it means the work temperature of the atomizer 1 is above 350° C. and the atomizer 1 is in an over-temperature condition, thus, stopping applying voltage to the atomizer 1 is required. The different materials may be utilized in a different production batch numbers to make the atomizer 1, such that the temperature resistance and work temperature of the atomizer 1 are not the same, and the predetermined value is selected according to the actual temperature resistance and work temperature of the atomizer 1.

Figure 8:
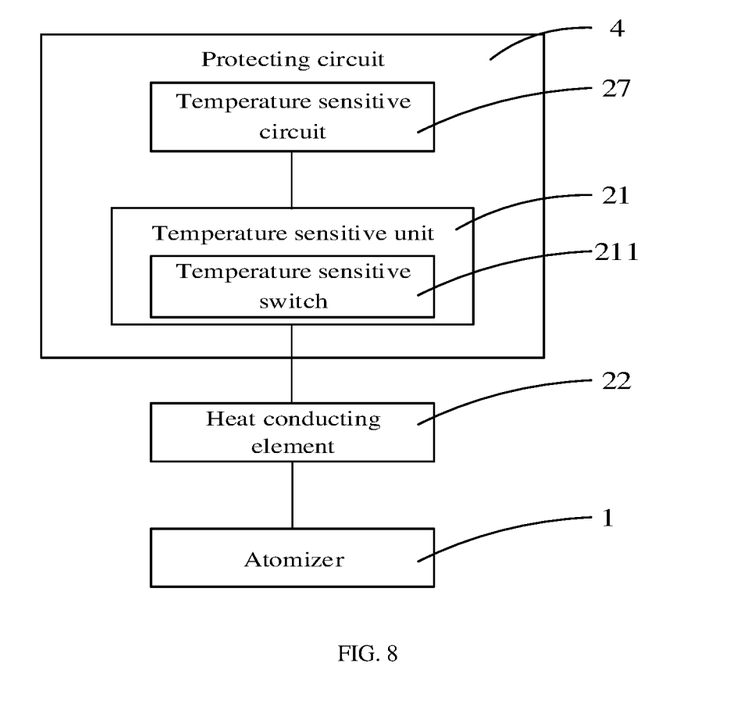
FIG. 8 is a block schematic view of an embodiment of the connection between the protecting circuit and a connection seat according to the present disclosure.

FIG. 8 is a block schematic view of the connection between the protecting circuit and a connection seat according to the present disclosure.

In one embodiment, the controlling device 2 further includes a connection seat 20, and the connection seat 20 is disposed at an end of the controlling device 2 near the atomizer 1. The connection seat 20 is provided with a heat conducting element 22, and the heat conducting element 22 is connected with the temperature sensitive unit 21. The heat conducting element 22 is configured to conduct heat from the atomizer 1 to the temperature sensitive unit 21, so that the temperature sensitive unit 21 senses the temperature of the atomizer 1 via the conducting element 22. The material and structure of the heat conducting element 22 are not limited, which may be selected as needed.

Figure 9:
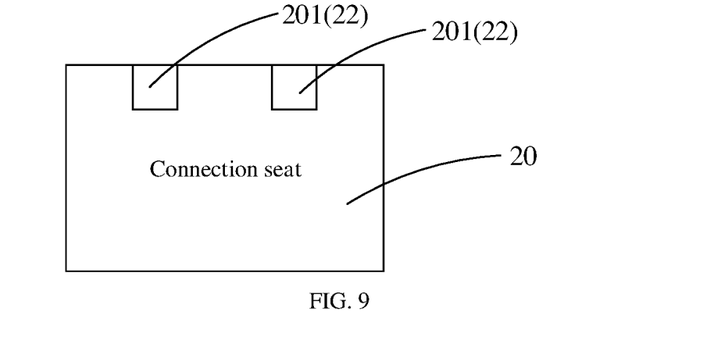
FIG. 9 is a block schematic view of an embodiment of the connection seat according to the present disclosure.
Figure 10:
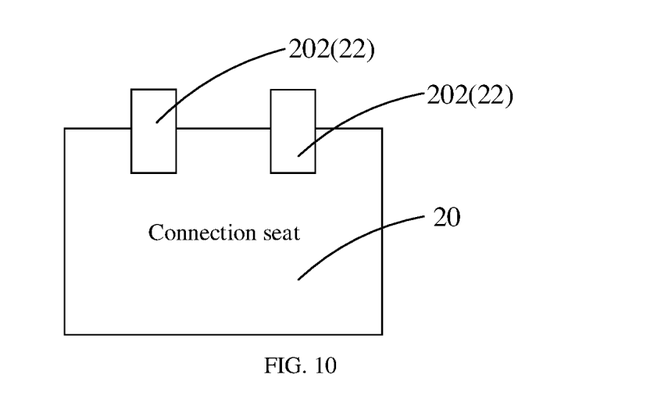
FIG. 10 is a block schematic view of another embodiment of the connection seat according to the present disclosure.

FIG. 9 is a block schematic view of a embodiment of the connection seat according to the present disclosure, and FIG. 10 is a block schematic view of another embodiment of the connection seat according to the present disclosure.

A connector 201 is disposed on the connection seat 20, the connector 201 is configured to fix the controlling device 2 and the atomizer 1. The connector 201 may be a magnetic attraction structure, a socket structure, a snap-fit structure or other structures. A corresponding connection structure is provided on the atomizer 1 to match the connector 201, so that the atomizer 1 and the controlling device 2 can be connected, and the connection manner is not limited in the present disclosure. One end of the connector 201 is contact with the atomizer 1, and the other end is disposed on the controlling device 2. In one embodiment, the connector 201 may be recycled, the connector 201 may not only be used to fix the atomizer 1 and the controlling device 2, but also be used as the heat conducting element 22. In another embodiment, a metal thimble 202 may also be provided on the connector 201 as a heat conducting element 22, the metal thimble 202 may be thermal conductive. One end of the metal thimble 202 may be disposed on the controlling device 2 and the other end may be in contact with the atomizer 1. In another embodiment, the heat conducting element 22 is a metal block, a surface of the metal block facing the atomizer 1 is in contact with the atomizer 1, and a surface of the metal block facing the connection seat 20 has a recess 221, and the temperature sensitive unit 21 is disposed in the recess 221. Other thermal conductive structures may also be provided on the connection seat 20 as the heat conducting element 22, as long as the heat of the atomizer 1 may be conducted, which is not limited in the present disclosure.

The temperature sensitive unit 21 includes a temperature sensor, the temperature sensor is selected from the group consisting of a thermocouple, a platinum resistance, a positive temperature coefficient (PTC) thermistor, and a negative temperature coefficient (NTC) thermistor. The temperature sensor may also be other thermal resistors, as long as the temperature can be sensed.

In one embodiment, the controlling device 2 further includes a controller 23, the controller 23 is electrically connected with the atomizing output circuit 3, and the controller 23 is electrically connected with the temperature sensitive unit 21. The heat generated by the atomizer 1 is conducted to the controlling device 2 by the heat conducting element 22. The temperature sensor senses the temperature of the atomizer 1 via the heat conducting element 22, and transmits the sensed temperature to the controller 23. The controller 23 compares the temperature with the predetermined value. In response to the temperature is higher than the predetermined value, the controller 23 controls the atomizing output circuit 3 to be disconnected, that is, the temperature sensitive circuit 27 makes the atomizing output circuit 3 stop applying any voltage to the atomizer 1. Namely, the heat conducting element 22, the temperature sensitive unit 21, and the controller 23 cooperatively work to realize the overheating protection of atomizer 1.

The controlling device 2 further includes a memory 24 and a reminder 25. The memory 24 is utilized to store predetermined values. The memory 24 is connected with the controller 23, and the predetermined value in the memory 24 is transmitted to the controller 23, so that the controller 23 compares the predetermined value to the temperature of the atomizer 1 sensed by the temperature sensitive unit 21. The reminder 25 is configured to alert a user that the atomizer 1 is stopped working after the atomizing output circuit 3 is controlled to be disconnected. The reminder 25 is selected from the group consisting of a vibration motor, an indicator light, a horn, and a display screen. The reminding manner of the reminder 25 includes but not limited to, vibration, light, sound, etc., as long as the purpose of reminding is achieved. After the user receives the alert, the user can stop using the electronic atomization device first and uses the electronic atomization device again after cooling, or continue to use the electronic atomization device for suction.

Figure 4:
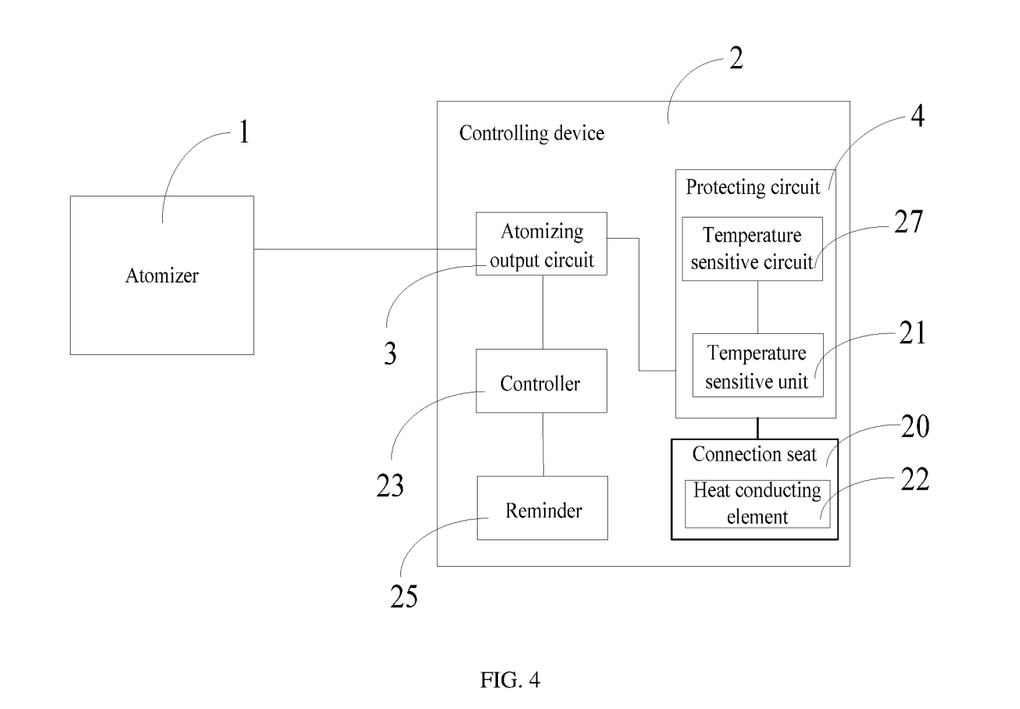
FIG. 4 is a block schematic view of a second embodiment of the electronic atomization device according to the present disclosure.

FIG. 4 is a block schematic view of a second embodiment of the electronic atomization device according to the present disclosure.

In the second embodiment, the structure of the electronic atomization device is substantially the same as the electronic atomization device of the first embodiment, except that the function of the temperature sensitive unit 21 is different, so that the operating principle of the protecting circuit 4 is different.

The controlling device 2 includes an atomizing output circuit 3 and a protecting circuit 4. The atomizing output circuit 3 is utilized to apply a voltage to the atomizer 1, so that the atomizer 1 can work. The aerosol-generating material may be heated during operation of the atomizer 1, a heat is generated during heating the aerosol-generating material, and the heat generated by continuously heating the aerosol-generating material may be transmitted to a connection between the atomizer 1 and the controlling device 2, and further transmitted to the controlling device 2. The protecting circuit 4 includes a temperature sensitive unit 21 and a temperature sensitive circuit 27, and the temperature sensitive unit 21 is configured to sense a temperature of the atomizer 1. The temperature sensitive circuit 27 is configured to control the atomizing output circuit 3 according to the temperature of the atomizer 1 sensed by the temperature sensitive unit 21. In response to the temperature of the atomizer 1 is higher than a predetermined value, the atomizing output circuit 3 is controlled to be disconnected. The predetermined value is 50-80° C., in one embodiment, the predetermined value is 60-70° C. The predetermined value is selected according to the actual heat transmitting and consumption, as long as the predetermined value does not cause the atomizer 1 to be melted or deformed, and does not conflict with the normal work temperature of the atomizer 1. The different materials may be utilized in a different production batch numbers to make the atomizer 1, such that the temperature resistance and work temperature of the atomizer 1 are not the same, and the predetermined value is selected according to the actual temperature resistance and work temperature of the atomizer 1.

Referring to FIG. 8, in one embodiment, the controlling device 2 further includes a connection seat 20, and the connection seat 20 is disposed at an end of the controlling device 2 near the atomizer 1. The connection seat 20 is provided with a heat conducting element 22, and the heat conducting element 22 is connected with the temperature sensitive unit 21. The heat conducting element 22 is configured to conduct heat from the atomizer 1 to the temperature sensitive unit 21, so that the temperature sensitive unit 21 senses the temperature of the atomizer 1 via the conducting element 22. The material and structure of the heat conducting element 22 are not limited, which may be selected as needed.

Referring to FIG. 8, FIG. 9 and FIG. 10, a connector 201 is disposed on the connection seat 20, the connector 201 is configured to fix the controlling device 2 and the atomizer 1. The connector 201 may be a magnetic attraction structure, a socket structure, a snap-fit structure or other structures. A corresponding connection structure is provided on the atomizer 1 to match the connector 201, so that the atomizer 1 and the controlling device 2 can be connected, and the connection manner is not limited in the present disclosure. One end of the connector 201 is contact with the atomizer 1, and the other end is disposed on the controlling device 2. In one embodiments, the connector 201 may be recycled, the connector 201 may not only be used to fix the atomizer 1 and the controlling device 2, but also be used as the heat conducting element 22. In another embodiment, a metal thimble 202 may also be provided on the connector 201 as a heat conducting element 22, the metal thimble 202 may be thermally conductive. One end of the metal thimble 202 may be disposed on the controlling device 2 and the other end may be connected with the atomizer 1. In other embodiments, the heat conducting element 22 is a metal block, a surface of the metal block facing the atomizer 1 is in contact with the atomizer 1, and a surface of the metal block facing the connection seat 20 has a recess 221, and the temperature sensitive unit 21 is disposed in the recess 221. Other thermal conductive structures may also be provided on the connection seat 20 as the heat conducting element 22, as long as the heat of the atomizer 1 may be conducted, which is not limited in the present disclosure.

Referring to FIG. 8, the temperature sensitive unit 21 includes a temperature sensitive switch 211, and the temperature sensitive switch 211 is configured to sense the temperature of the atomizer 1 and determine whether or not the temperature of the atomizer is higher than the predetermined value. In response to the temperature of the atomizer 1 is higher than the predetermined value, the temperature sensitive circuit 27 is controlled to be connected or disconnected according to the temperature sensitive switch 211 being turn on or turn off. That is, the temperature sensitive circuit 27 is controlled to form a loop or open circuit.

In one embodiment, the atomizing output circuit 3 is connected with the protecting circuit 4. The protecting circuit 4 includes a temperature sensitive unit 21 and a temperature sensitive circuit 27. The temperature sensitive unit 21 is configured to control the temperature sensitive circuit 27 to be disconnected according to the temperature of the atomizer 1 sensed by the temperature sensitive unit 21, so that the atomizing output circuit 3 is disconnected from the atomizer 1 according to the disconnection of the temperature sensitive circuit 27. The temperature sensitive switch 211 is in contact with the heat conducting element 22 and connected with the atomizing output circuit 3. The heat generated by the atomizer 1 is conducted to the controlling device 2 by the heat conducting element 22, the temperature sensitive switch 211 senses the temperature of the atomizer 1 via the heat conducting element 22, and determines whether or not the temperature of the atomizer 1 is higher than the predetermined value. In response to the temperature of the atomizer 1 is higher than the predetermined value, the temperature sensitive switch 211 changes from turning on to turning off. The temperature sensitive switch 211 is turn off, so that the temperature sensitive circuit 27 of the protecting circuit 4 is disconnected, thus the atomizing output circuit 3 is disconnected from the atomizer 1. No matter whether the controlling device 2 continuously output the voltage to the atomizer 1, the atomizer 1 cannot receives the voltage. Thus, the purpose of effectively protecting the atomizer 1 from overheating is achieved, and melting or deformation of the atomizer 1 caused by continuously heating is avoided, and the risks of the electronic atomization device is reduced. Namely, the heat conducting element 22 and the temperature sensitive unit 21 cooperatively work to realize the overheating protection of the atomizer 1.

The controlling device 2 also includes a controller 23 and a reminder 25. When the electronic atomization device is started, the controller 23 controls the atomizer 1 to start. The atomizing output circuit 3 is electrically connected with the controller 23, and the controller 23 controls the reminder 25 to make a response reminder after the atomizing output circuit 3 is controlled to be disconnected. The reminder 25 is configured to alert the user that the atomizer 1 stopped working after the atomizing output circuit 3 is controlled to be disconnected. The reminder 25 is selected from the group consisting of a vibration motor, an indicator light, a horn, and a display screen. The reminding manner of the reminder 25 includes but not limited to, vibration, light, sound, etc., as long as the purpose of reminding is achieved.

FIG. 5 is a block schematic view of a third embodiment of the electronic atomization device according to the present disclosure, and FIG. 6 is a schematic structural view of the atomizing output circuit and the protecting circuit in the third embodiment of the electronic atomization device according to the present disclosure.

In a third embodiment, the structure of the electronic atomization device is substantially the same as the structure in the second embodiment, except that the atomizing output circuit 3 includes a cutoff device 26, so that the operating principle for protecting the atomizer 1 is different.

In one embodiment, the atomizing output circuit 3 includes a cut-off device 26, the cut-off device 26 is configured to disconnect atomizing output circuit 3 from the atomizer 1, in response to the temperature sensed by the temperature sensitive unit 21 is higher than the predetermined value. The cut-off device 26 is one of a relay and a metal oxide semiconductor (MOS) field-effect transistor. The cutoff device 26 may also be other on-off devices, as long as the purpose of the disconnection between the atomizing output circuit 3 and the atomizer 1 can be achieved under a certain specific conditions (the temperature sensed by the temperature sensitive unit 21 is higher than the predetermined value).

The atomizing output circuit 3 is connected with the protecting circuit 4. The protecting circuit 4 includes a temperature sensitive unit 21 and a temperature sensitive circuit 27. The temperature sensitive unit 21 is configured to control the connection or disconnection of the temperature sensitive circuit 27 according to the temperature of the atomizer 1 sensed by the temperature sensitive unit 21, so that the atomizing output circuit 3 is disconnected from the atomizer 1 according to the connection or disconnection of the temperature sensitive circuit 27. The connection or disconnection of the temperature sensitive circuit 27 is that the temperature sensitive circuit 27 form a loop or open circuit. The cut-off device 26 is connected with the protecting circuit 4. The heat generated by the atomizer 1 is conducted to the controlling device 2 by the heat conducting element 22, the temperature sensitive switch 211 senses the temperature of the atomizer 1 via the heat conducting element 22, and determines whether or not the temperature of the atomizer 1 is higher than the predetermined value. In response to the temperature of the atomizer 1 is higher than the predetermined value, the temperature sensitive switch 211 changes from turning on to turning off, the cut-off device 26 is disconnected, the atomizing output circuit 3 is disconnected from the atomizer 1. No matter whether the controlling device 2 continuously output the voltage to the atomizer 1, the atomizer 1 cannot receives the voltage. Thus, the purpose of effectively protecting the atomizer 1 from overheating is achieved, and melting or deformation of the atomizer 1 caused by continuously heating is avoided, and the risks of the electronic atomization device is reduced. Namely, the heat conducting element 22 and the temperature sensitive unit 21 cooperatively work to realize the overheating protection of the atomizer 1. In another embodiment, the temperature sensitive switch 211 senses that the temperature of the atomizer 1 is higher than the predetermined value, the temperature sensitive switch 211 changes from turning on to turning off. The temperature sensitive switch 211 changes from turning on to turning off, the temperature sensitive circuit 27 of the protecting circuit 4 changes from disconnection to connection, so that the cut-off device 26 is disconnected, and further so that the atomizing output circuit 3 is disconnected. In practice, as long as the state change of the temperature sensitive circuit 27 between connection and disconnection can make the cut-off device 26 being disconnected, so that the atomizing output circuit 3 is disconnected from the atomizer 1.

Figure 7:
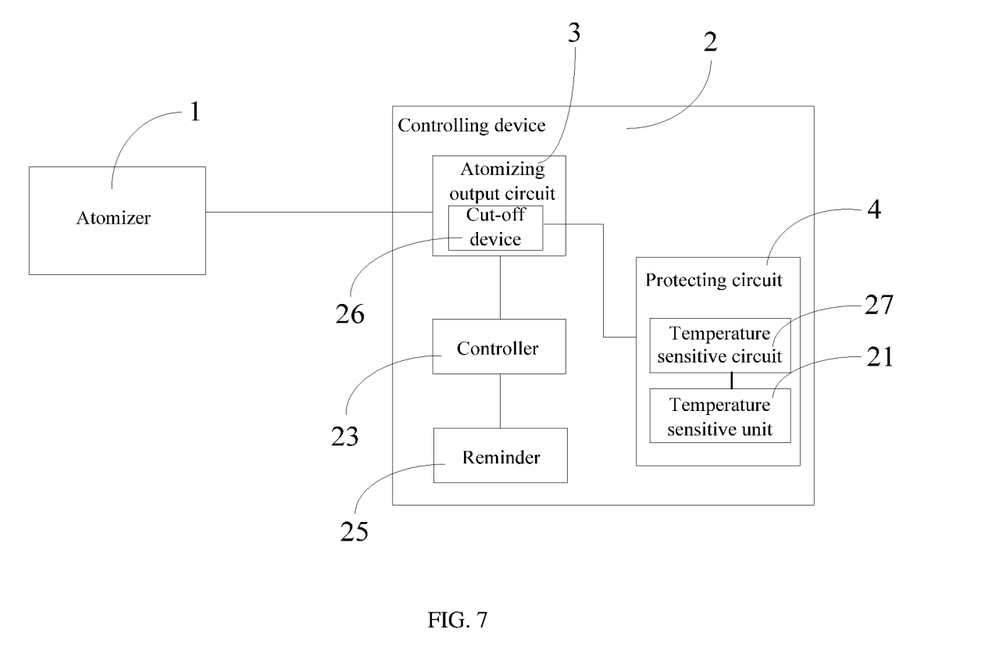
FIG. 7 is a block schematic view of a fourth embodiment of the electronic atomization device according to the present disclosure.

FIG. 7 is a block schematic view of a fourth embodiment of the electronic atomization device provided according to the present disclosure (only one condition is shown).

In a fourth embodiment, the temperature sensitive unit 21 may be disposed on the connection seat 20. One end of the temperature sensitive unit 21 is exposed from a side of the controlling device 2 facing the atomizer 1. Namely, one end of the temperature sensitive unit 21 is disposed on the controlling device 2, and the other end may be in contact with the atomizer 1. The temperature sensitive unit 21 senses the temperature of the atomizer 1 directly, and there is no need to measure the heat conducted from the atomizer 1 to the temperature sensitive unit 21 of the controlling device 2 by the heat conducting element 22.

Figure 5:
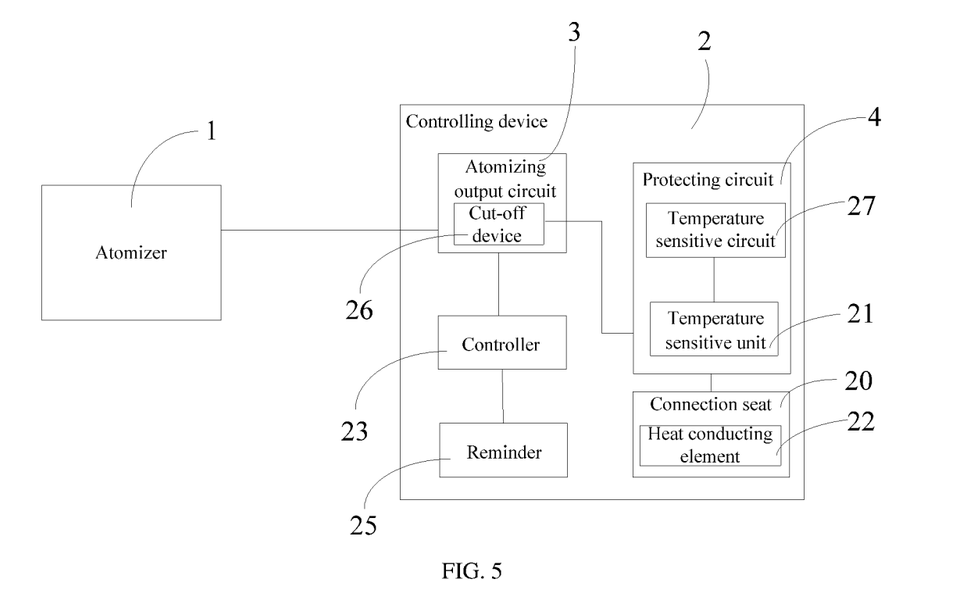
FIG. 5 is a block schematic view of a third embodiment of the electronic atomization device according to the present disclosure.
Figure 6:
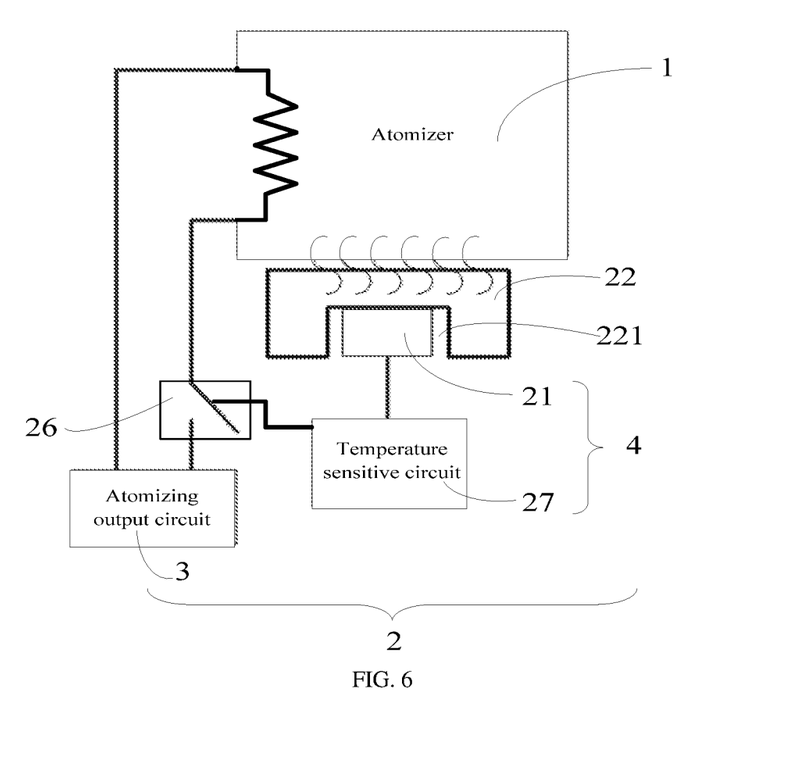
FIG. 6 is a schematic view of the atomizing output circuit and the protecting circuit in the third embodiment of the electronic atomization device according to the present disclosure.

In the fourth embodiment, the operating principle of the protecting circuit 4 for protecting the atomizer 1 in the same as the first embodiment, the second embodiment or the third embodiment, and is not repeated herein. Namely, the structure of the electronic atomization device in the fourth embodiment is substantially the same as the structure of the first embodiment, the second embodiment or the third embodiment, except that the heat conducting element 22 is omitted in the fourth embodiment. FIG. 7 shows the same operating principle as shown in FIG. 5 of the third embodiment.

The controlling device in the present disclosure includes an atomizing output circuit and a protecting circuit; the atomizing output circuit 3 is configured to be electrically connected with the atomizer and apply a voltage to the atomizer. The protecting circuit includes a temperature sensitive unit, and the temperature sensitive unit is configured to sense a temperature of the atomizer. In response to the temperature of the atomizer is higher than a predetermined value, the protecting circuit makes the electrical connection between the atomizing output circuit and the atomizer being disconnected, the purpose of effectively protecting the atomizer from overheating or deforming is achieved. The structure of present disclosure is simple, inexpensive by disposing the protecting circuit in the controlling device. The present disclosure accommodates the market, and the risks of thermal melting or deformation of the atomizer caused by continuously heating is avoided.

The above shows only embodiments of the present disclosure, but does not limit the scope of the present disclosure. Any equivalent structure or equivalent process transformation made based on the specification and the accompanying drawings of the present disclosure, applied directly or indirectly in other related arts, shall be included in the scope of the present disclosure.

The above described embodiments only express several embodiments of the disclosure, the description of which is more specific and detailed, but it cannot be understood as the limitation of the scope of the disclosure. It should be pointed out that for those skilled in the art, without departing from the concept of the invention, a number of deformations and improvements can be made, which belong to the protection scope of the disclosure. Therefore, the scope of protection of the disclosure patent shall be subject to the appended claims.

Depending on the exemplary embodiment, certain of the actions of methods described can be removed, others can be added, and the sequence of actions can be altered. It is also to be understood that the description and the claims drawn to a method may include some indication in reference to certain actions. However, the indication used is only to be viewed for identification purposes and not as a suggestion as to an order for the actions.

What is claimed is:

1. A controlling device, configured to be cooperatively utilized with an atomizer to atomize an aerosol-generating material, comprising:
   an atomizing output circuit, configured to be electrically connected with the atomizer and apply a voltage to the atomizer;
   a controller, electrically connected with the atomizing output circuit, and configured to control the atomizing output circuit;
   a protecting circuit, comprising a temperature sensitive unit, wherein the temperature sensitive unit is configured to sense a temperature of the atomizer; and a connection seat, wherein the connection seat is disposed at an end of the controlling device near the atomizer, the connection seat is provided with a heat conducting element, and the heat conducting element is configured to conduct heat from the atomizer to the temperature sensitive unit;

wherein, the protecting circuit is configured to control the atomizing output circuit according to the temperature of the atomizer sensed by the temperature sensitive unit; in response to the temperature of the atomizer being higher than a predetermined value, the protecting circuit makes the electrical connection between the atomizing output circuit and the atomizer become disconnected.

2. The controlling device of claim 1, wherein the controller is electrically connected with the temperature sensitive unit; the temperature sensitive unit transmits the temperature of the atomizer to the controller, and the controller compares the temperature of the atomizer to the predetermined value, and in response to the temperature of the atomizer being higher than the predetermined value, the controller controls the electrical connection between the atomizing output circuit and the atomizer become disconnected.

3. The controlling device of claim 2, wherein the temperature sensitive unit comprises a temperature sensor, the temperature sensor is selected from the group consisting of a thermocouple, a platinum resistance, a positive temperature coefficient (PTC) thermistor, and a negative temperature coefficient (NTC) thermistor.

4. The controlling device of claim 1, wherein the atomizing output circuit is connected with the protecting circuit; the temperature sensitive unit is configured to control the connection or disconnection of the protecting circuit according to the temperature of the atomizer sensed by the temperature sensitive unit, so that the atomizing output circuit is disconnected according to the connection or disconnection of the protecting circuit.

5. The controlling device of claim 4, wherein the temperature sensitive unit comprises a temperature sensitive switch, and the temperature sensitive switch is configured to sense the temperature of the atomizer and determine whether or not the temperature of the atomizer is higher than the predetermined value; the protecting circuit further comprises a temperature sensitive circuit; and in response to the temperature of the atomizer being higher than the predetermined value, the connection or disconnection of the temperature sensitive circuit is controlled by the temperature sensitive switch being turn on or turn off.

6. The controlling device of claim 5, wherein the atomizing output circuit comprises a cut-off device, the cut-off device is connected with the temperature sensitive circuit, and the atomizing output circuit is controlled to be disconnected in response to the connection or disconnection of the temperature sensitive circuit;

the cut-off device is one of a relay and a metal oxide semiconductor (MOS) field-effect transistor.

7. The controlling device of claim 1, wherein a connector is disposed on the connection seat, the connector is configured to fix the controlling device and the atomizer, and the connector is used as the heat conducting element.

8. The controlling device of claim 1, wherein the heat conducting element is a metal thimble.

9. The controlling device of claim 1, wherein the predetermined value is in a range from about 50° C. to about 80° C.

10. The controlling device of claim 1, further comprising a memory, wherein the predetermined value is stored in the memory.

11. The controlling device of claim 1, further comprising a reminder; wherein in response to the atomizing output circuit and the atomizer being disconnected, the controller controls the reminder to alert a user.

12. An electronic atomization device, comprising:
an atomizer; and
a controlling device, configured to be cooperatively utilized with the atomizer to atomize an aerosol-generating material, comprising:
an atomizing output circuit, configured to be electrically connected with the atomizer and apply a voltage to the atomizer;
a controller, electrically connected with the atomizing output circuit, and configured to control the atomizing output circuit;
a protecting circuit, comprising a temperature sensitive unit, wherein the temperature sensitive unit is configured to sense a temperature of the atomizer;
a connection seat, wherein the connection seat is disposed at an end of the controlling device near the atomizer, the connection seat is provided with a heat conducting element, and the heat conducting element is configured to conduct heat from the atomizer to the temperature sensitive unit; and
a connector, disposed on the connection seat, wherein the connector is configured to fix the controlling device and the atomizer, and the connector is used as the heat conducting element:
wherein, the protecting circuit is configured to control the atomizing output circuit according to the temperature of the atomizer sensed by the temperature sensitive unit; in response to the temperature of the atomizer being higher than a predetermined value, the protecting circuit makes the electrical connection between the atomizing output circuit and the atomizer become disconnected.

13. The electronic atomization device of claim 12, wherein the controller is electrically connected with the temperature sensitive unit; the temperature sensitive unit transmits the temperature of the atomizer to the controller, and the controller compares the temperature of the atomizer to the predetermined value, and in response to the temperature of the atomizer being higher than the predetermined value, the controller controls the electrical connection between the atomizing output circuit and the atomizer become disconnected.

14. The electronic atomization device of claim 13, wherein the temperature sensitive unit comprises a temperature sensor, the temperature sensor is selected from the group consisting of a thermocouple, a platinum resistance, a positive temperature coefficient (PTC) thermistor, and a negative temperature coefficient (NTC) thermistor.

15. The electronic atomization device of claim 12, wherein the atomizing output circuit is connected with the protecting circuit; the temperature sensitive unit is configured to control the connection or disconnection of the protecting circuit according to the temperature of the atomizer sensed by the temperature sensitive unit, so that the atomizing output circuit is disconnected according to the connection or disconnection of the protecting circuit.

16. The electronic atomization device of claim 15, wherein the temperature sensitive unit comprises a temperature sensitive switch, and the temperature sensitive switch is configured to sense the temperature of the atomizer and determine whether or not the temperature of the atomizer is higher than the predetermined value; and in response to the temperature of the atomizer being higher than the predetermined value, the connection or disconnection of the protecting circuit is controlled by the temperature sensitive switch being turn on or turn off.

17. The electronic atomization device of claim 16, wherein the atomizing output circuit comprises a cut-off device, the cut-off device is connected with the protecting circuit, and the atomizing output circuit is controlled to be disconnected in response to the connection or disconnection of the protecting circuit;

the cut-off device is one of a relay and a metal oxide semiconductor (MOS) field-effect transistor.

18. The electronic atomization device of claim 12, wherein the controlling device further comprises a memory, and the predetermined value is stored in the memory.

* * * * *